(12) United States Patent
Asanoi et al.

(10) Patent No.: US 10,078,163 B2
(45) Date of Patent: Sep. 18, 2018

(54) POLARIZING PLATE AND METHOD FOR PRODUCING POLARIZING PLATE

(71) Applicant: NITTO DENKO CORPORATION, Ibaraki-shi, Osaka (JP)

(72) Inventors: Yoshiaki Asanoi, Ibaraki (JP); Kazumasa Okada, Ibaraki (JP); Shoichi Matsuda, Ibaraki (JP); Hiroyuki Takemoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/110,851

(22) PCT Filed: Jan. 22, 2015

(86) PCT No.: PCT/JP2015/051645
§ 371 (c)(1),
(2) Date: Jul. 11, 2016

(87) PCT Pub. No.: WO2015/115296
PCT Pub. Date: Aug. 6, 2015

(65) Prior Publication Data
US 2016/0334557 A1   Nov. 17, 2016

(30) Foreign Application Priority Data

Jan. 30, 2014 (JP) ................. 2014-015574
Jan. 21, 2015 (JP) ................. 2015-009688

(51) Int. Cl.
*G02F 1/1337* (2006.01)
*G02B 5/30* (2006.01)
*B29D 11/00* (2006.01)

(52) U.S. Cl.
CPC ........ *G02B 5/3016* (2013.01); *B29D 11/0073* (2013.01); *B29D 11/00644* (2013.01);
(Continued)

(58) Field of Classification Search
CPC ............... G02B 5/3016; G02B 5/3083; B29D 11/00644; B29D 11/0073; G02F 1/133711; G02F 2202/08
(Continued)

(56) References Cited

U.S. PATENT DOCUMENTS

2005/0068476 A1* 3/2005 Okabe ............... B29D 11/0073
349/96
2009/0312453 A1* 12/2009 Shin ........................ C08F 20/10
522/33

(Continued)

FOREIGN PATENT DOCUMENTS

JP       8-120220 A    5/1996
JP    2002-277636 A    9/2002
(Continued)

OTHER PUBLICATIONS

International Search Report dated Mar. 31, 2015, issued in counterpart international application No. PCT/JP2015/051645(3pages).
(Continued)

*Primary Examiner* — Charles Chang
(74) *Attorney, Agent, or Firm* — Westerman, Hattori, Daniels & Adrian, LLP

(57) ABSTRACT

The present invention is to provide a polarizing plate including an alignment layer applicable to various types of substrates, and having excellent light polarization properties. A polarizing plate 1 of the present invention includes an alignment layer 3, and a polarizing layer 4 disposed on the alignment layer 3, and containing an organic dye having lyotropic liquid crystallinity, wherein the organic dye in the polarizing, layer 4 is in a form of supramolecular aggregates, and the alignment layer 3 contains a cycloolefin based resin.

7 Claims, 2 Drawing Sheets

(52) U.S. Cl.
CPC ...... *G02B 5/3083* (2013.01); *G02F 1/133711* (2013.01); *G02F 2202/08* (2013.01)

(58) Field of Classification Search
USPC .................................................. 349/123–131
See application file for complete search history.

(56) References Cited

U.S. PATENT DOCUMENTS

| | | | |
|---|---|---|---|
| 2010/0032866 A1* | 2/2010 | Nakai | B29C 71/0072 264/291 |
| 2010/0038589 A1 | 2/2010 | Matsuda et al. | |
| 2010/0039608 A1 | 2/2010 | Matsuda et al. | |
| 2010/0118232 A1* | 5/2010 | Cheong | C09K 19/12 349/74 |
| 2010/0288166 A1 | 11/2010 | Matsuda et al. | |
| 2010/0314784 A1 | 12/2010 | Miyazaki et al. | |
| 2011/0070363 A1 | 3/2011 | Komatsubara et al. | |
| 2011/0097483 A1 | 4/2011 | Umemoto et al. | |
| 2011/0217638 A1 | 9/2011 | Kim et al. | |
| 2012/0026305 A1 | 2/2012 | Kim et al. | |
| 2013/0044286 A1* | 2/2013 | Yoon | G02F 1/13363 349/194 |
| 2013/0265529 A1 | 10/2013 | Wakizaka et al. | |
| 2013/0277871 A1 | 10/2013 | Miyazaki et al. | |
| 2014/0077187 A1* | 3/2014 | Lee | H01L 51/5281 257/40 |

FOREIGN PATENT DOCUMENTS

| | | |
|---|---|---|
| JP | 2005-330412 A | 12/2005 |
| JP | 2006-47966 A | 2/2006 |
| JP | 2008-197351 A | 8/2008 |
| JP | 2010-102229 A | 5/2010 |
| JP | 2011-008112 A | 1/2011 |
| JP | 2012-517024 A | 7/2012 |
| JP | 2013-156665 A | 8/2013 |
| JP | 2013-174925 A | 9/2013 |
| JP | 2013-231955 A | 11/2013 |
| WO | 2009/084317 A1 | 7/2009 |
| WO | 2009/101849 A1 | 8/2009 |
| WO | 2009/147872 A1 | 12/2009 |
| WO | 2011/105150 A1 | 9/2011 |

OTHER PUBLICATIONS

Extended (supplementary) European Search Report dated Aug. 9, 2017, issued in counterpart European Application No. 15743245.1. (8 pages).

* cited by examiner

POLARIZING PLATE AND METHOD FOR PRODUCING POLARIZING PLATE

TECHNICAL FIELD

The present invention relates to a polarizing plate including an alignment layer and a method for producing the same.

BACKGROUND ART

It has been heretofore known to apply coating liquid containing organic dyes having lyotropic liquid crystallinity, on a substrate, and then to dry the coating liquid to form a polarizing layer on the substrate.

The surface of a substrate is typically provided with an alignment regulating force by an alignment treatment (e.g., a rubbing treatment). Thus, the organic dyes contained in the coating liquid are aligned in a predetermined direction due to the alignment regulating force on the surface of the substrate. Then, drying the applied coating liquid causes the alignment of the organic dyes to be fixed, and thus a dry coating film (polarizing layer) having light polarization properties is formed on the substrate.

However, depending on the formation material of the substrate, the organic dyes cannot be aligned, or is difficult to align, in a predetermined direction by merely providing an alignment treatment on the surface of the substrate.

To solve this problem, it is known to form an alignment layer containing a polyimide based resin (hereinafter referred to as "polyimide based alignment layer") on a substrate, to apply application liquid containing organic dyes on this polyimide based alignment layer, and then to dry the application liquid to form a polarizing layer (see, e.g., Patent Document 1). A polyimide based alignment layer contains a polyimide based resin therein, and has a surface on which an alignment treatment has been performed.

However, a polyimide based alignment layer does not have a sufficient level of an alignment regulating force. This poses a problem in that, depending on the organic dye material, the organic dye may not be sufficiently aligned on the alignment layer, which may degrade the light polarization properties of the polarizing layer.

Moreover, formation of a polyimide based alignment layer requires application, on a substrate, of application liquid containing polyamic acid, which is a precursor of polyimide, and firing of this coating film at a high temperature (around about 200° C.) to imidize the polyamic acid. If the firing temperature of the coating film is higher than the glass transition temperature (Tg) of the substrate, the substrate will be heated to a temperature above its glass transition temperature during firing. Heating the substrate to a temperature above its glass transition temperature may result in a change in characteristics, such as the mechanical strength and/or optical characteristics, of the substrate. Thus, formation of a polyimide based alignment layer requires use of a material having a glass transition temperature higher than such firing temperature, as the formation material of the substrate. In other words, a problem exists in that formation of a polyimide based alignment layer on a substrate places a restriction on the formation material of the substrate. In particular, when the formation material of the substrate is a resin, the glass transition temperature of the resin is typically often lower than the firing temperature, and thus, it is not feasible to form an alignment layer on various types of resin substrates.

[Patent Document 1] JP 2006-47966 A

SUMMARY OF THE INVENTION

It is an object of the present invention to provide a polarizing plate including an alignment layer applicable to various types of substrates, and having excellent light polarization properties, and a method for producing such a polarizing plate.

The present inventors have searched for a formation material for an alignment layer applicable to various types of substrates, and capable of suitably aligning an organic dye, and have made the present invention.

A polarizing plate of the present invention includes an alignment layer, and a polarizing layer disposed on the alignment layer, and containing organic dyes having lyotropic liquid crystallinity, wherein the organic dyes in the polarizing layer is in a form of supramolecular aggregates, and the alignment layer contains a cycloolefin based resin.

A preferable polarizing plate of the present invention further includes a substrate, and the alignment layer is disposed on the substrate.

In a preferable polarizing plate of the present invention, the cycloolefin based resin is amorphous. In a preferable polarizing plate of the present invention, the cycloolefin based resin is a norbornene based resin. Further, in a preferable polarizing plate of the present invention, the alignment layer is substantially optically isotropic.

In a preferable polarizing plate of the present invention, the substrate is a resin film containing a resin, and the resin has a glass transition temperature (Tg) of 180° C. or less. Further, in a preferable polarizing plate of the present invention, the substrate has a surface having releasability.

In another aspect of the present invention, a method for producing a polarizing plate is provided.

A method for producing a polarizing plate includes a step of applying a first coating liquid containing a cycloolefin based resin to form a first coating film, a step of drying the first coating film to form a first dry coating film, a step of performing an alignment treatment on a surface of the first dry coating film to form an alignment layer, a step of applying a second coating liquid containing organic dyes on the alignment layer to form a second coating film, and a step of drying the second coating film to form a second dry coating film as a polarizing layer.

In a preferable polarizing plate of the present invention, the alignment treatment is a rubbing treatment.

A polarizing plate of the present invention includes an alignment layer applicable to various types of substrates, and has excellent light polarization properties.

DESCRIPTION OF THE PREFERRED EMBODIMENTS

Hereinafter, the present invention is specifically described in detail. In this specification, the terms "first" and "second" may be added as prefixes. These prefixes, however, are only added in order to distinguish the terms and do not have specific meaning such as order and relative merits.

Figure 1:
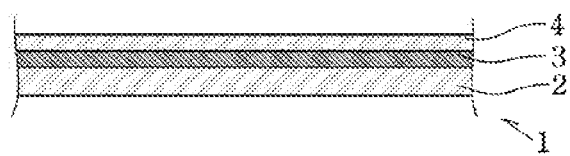
FIG. 1 is a partial sectional view illustrating a polarizing plate according to one embodiment of the present invention.

As used herein, for purposes of illustration, the term "up" denoting a direction represents the upward direction in the drawings, and the term "down" represents the downward direction in the drawings, with respect to the polarizing plate placed on a horizontal surface as illustrated in FIG. 1. As used herein, the notation "AAA to BBB" denotes "AAA or more and BBB or less."

A polarizing plate of the present invention includes an alignment layer, and a polarizing layer disposed on the alignment layer. A polarizing plate according to one embodiment of the present invention is hereinafter described.

Figure 2:
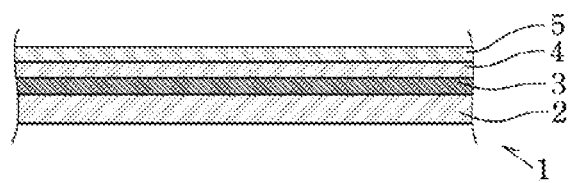
FIG. 2 is a partial sectional view illustrating a polarizing plate according to the other embodiment of the present invention.
Figure 3:
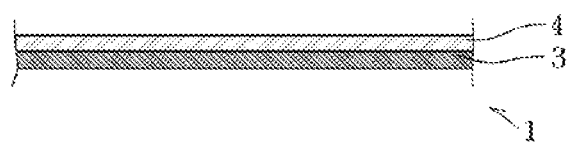
FIG. 3 is a partial sectional view illustrating a polarizing plate according to the other embodiment of the present invention.

As illustrated in FIG. 1, a polarizing plate 1 includes, from bottom to top, a substrate 2, an alignment layer 3, and a polarizing layer 4. In FIG. 1, the alignment layer 3 is disposed on the substrate 2, and the polarizing layer 4 is disposed on the alignment layer 3. Note that the polarizing plate 1 of the present invention is not limited to one having a layer structure as illustrated in FIG. 1, but, for example, may further include a protective layer 5 on the polarizing layer 4 as illustrated in FIG. 2, or may not include the substrate 2 as illustrated in FIG. 3 (in other words, the polarizing plate 1 may be formed only of the alignment layer 3 and the polarizing layer 4). A polarizing plate without the substrate, such as one illustrated in FIG. 3, can be obtained by removing a laminate formed of the alignment layer 3 and the polarizing layer 4 from the substrate 2, in a polarizing plate including the substrate 2, the alignment layer 3, and the polarizing layer 4, such as one illustrated in FIG. 1.

Practically, if the protective layer 5 is laminated on the polarizing layer 4, a suitable adhesion layer of any kind (not illustrated) is provided between the protective layer 5 and the polarizing layer 4. Examples of material for forming the adhesion layer include, for example, adhesive agents, binders, and anchor coats.

Figure 4:
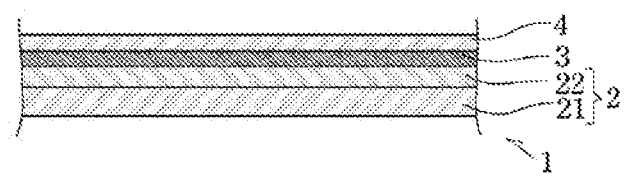
FIG. 4 is a partial sectional view illustrating a polarizing plate according to the other embodiment of the present invention.

The substrate 2 may be a monolayer structure as illustrated in FIGS. 1 and 2, or a multilayer structure including two or more layers. For example, in one aspect, the substrate 2 includes two layers, which are a base layer 21 and a retardation layer 22, as illustrated in FIG. 4. Alternatively, the substrate 2 may be a multilayer structure including three or more layers (not illustrated). A substrate 2 having such a multilayer structure may be formed by disposing the retardation layer 22 on the base layer 21 with an adhesion layer (not illustrated) interposed therebetween.

Note that, in FIGS. 1 to 4, no other layers are present between the alignment layer 3 and the polarizing layer 4, and thus the upper surface of the alignment layer 3 and the lower surface of the polarizing layer 4 are in contact with each other.

In the polarizing plate of the present invention, the organic dyes in the polarizing layer are aligned due to the alignment regulating force of the alignment layer. The structure of each layer is hereinafter described.

[Polarizing Layer]

The polarizing layer contains organic dyes having lyotropic liquid crystallinity. In the polarizing layer, the organic dyes are in the form of supramolecular aggregates. As used herein, the term "supramolecular aggregate" denotes a composite formed of a plurality of organic dye molecules associated with one another by hydrogen bonding or similar mechanism. As used herein, the term "lyotropic liquid crystallinity" refers to a nature of the organic dye characterized in that a change in temperature and/or in concentration of the coating liquid containing the organic dyes and a solvent causes a phase transition of isotropic phase—liquid crystal phase in the organic dye.

A polarizing layer containing organic dyes forming supramolecular aggregates can be obtained by, for example, applying coating liquid containing suitable organic dyes and a suitable solvent, and then drying the coating liquid.

An organic dye contained in a polarizing layer is not particularly limited as long as the organic dye has a lyotropic liquid crystallinity and may form supramolecular aggregates.

Such an organic dye may be, for example, an azo based compound, an anthraquinone based compound, a perylene based compound, a quinophthalone based compound, a naphthoquinone based compound, a merocyanine based compound and the like. The azo based compound is used preferably since it exhibits a good lyotropic liquid crystallinity.

Among the azo based compounds, an azo compound having an aromatic ring in its molecule is preferable, and a disazo compound having a naphthalene ring is more preferable. A polarizing layer excellent in polarization properties can be obtained by coating and drying a coating liquid containing such an azo based compound.

Further, the azo based compound is preferably an azo based compound having a polar group in its molecule. An azo based compound having a polar group is soluble in an aqueous solvent and is likely to form supramolecular aggregates by being dissolved in the aqueous solvent. For this reason, a coating liquid containing an azo based compound having a polar group exhibits an especially good lyotropic liquid crystallinity.

Here, the polar group means a functional group having a polarity. The polar group may be, for example, a functional group containing oxygen and/or nitrogen having a comparatively large electronegativity such as OH group, COOH group, $NH_2$ group, $NO_2$ group, or CN group.

A specific example of the azo based compound having a polar group may be the aromatic disazo compound represented by the following general formula (1).

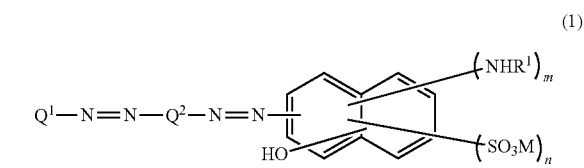

(1)

In the general formula (1), $Q^1$ represents a substituted or non-substituted aryl group, $Q^2$ represents a substituted or non-substituted arylene group, $R^1$ independently represents a hydrogen atom, a substituted or non-substituted alkyl group, a substituted or non-substituted acetyl group, a substituted or non-substituted benzoyl group, or a substituted or non-substituted phenyl group, M represents a counter ion, m represents an integer of 0 to 2, n represents an integer of 0 to 6. However, at least one of m and n is not 0, and $1 \leq m+n \leq 6$. When m is 2, each $R^1$ may be the same or different.

The groups OH, $(NHR^1)_m$, and $(SO_3M)_n$ shown in the general formula (1) may each be bonded to any one of the seven substitution sites of the naphthyl ring.

In the present specification, "substituted or non-substituted" means "substituted with a substituent group or not substituted with a substituent group".

The bonding position of the naphthyl group and the azo group (—N=N—) in the general formula (1) is not particularly limited. The naphthyl group indicates the naphthyl group shown on the right side in the formula (1). Preferably, the naphthyl group and azo group are bonded at the 1-position or the 2-position of the naphthyl group.

When the alkyl group, acetyl group, benzoyl group, or phenyl group of $R^1$ of the general formula (1) has a substituent group, the substituent group may be, for example, any of the substituent groups exemplified in the following aryl group or arylene group.

$R^1$ is preferably a hydrogen atom, a substituted or non-substituted alkyl group, a substituted or non-substituted acetyl group, more preferably a hydrogen atom.

The substituted or non-substituted alkyl group may be a substituted or non-substituted alkyl group with a carbon number of 1 to 6.

In the general formula (1), M (counter ion) is preferably a hydrogen ion; an alkali metal ion such as Li, Na, K, Cs and the like; an alkaline-earth metal ion such as Ca, Sr, Ba and the like; other metal ions; an ammonium ion that may be substituted by an alkyl group or a hydroxyalkyl group; a salt of an organic amine; and the like. The metal ion includes, for example, $Ni^+$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, $Ce^{3+}$, and the like. The organic amine may be an alkylamine with a carbon number of 1 to 6, an alkylamine with a carbon number of 1 to 6 having a hydroxyl group, an alkylamine with a carbon number of 1 to 6 having a carboxyl group. In the above general formula (1), when two or more $SO_3M$ groups are present, each M may be the same or different. Also, when M of the $SO_3M$ group is a divalent or more-valent cation in the above general formula (1), the M may be bonded to the adjacent $SO_3$ of another azo based compound of the general formula (1) to form supramolecular aggregates.

In the general formula (1), m is preferably 1. Also, n in the general formula (1) is preferably 1 or 2.

Specific examples of the naphthyl group in the general formula (1) includes, for example, the following formulae (a) to (l) and the like. $R^1$ and M of the formulae (a) to (l) are the same as those in the general formula (1).

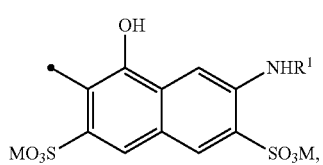
(a)

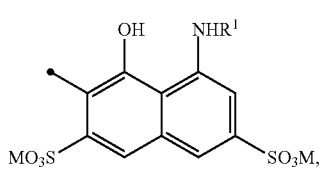
(b)

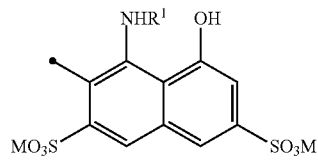
(c)

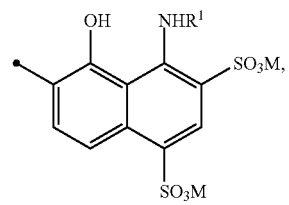
(d)

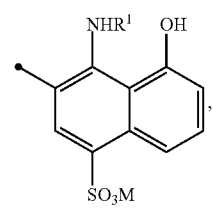
(e)

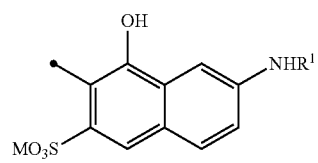
(f)

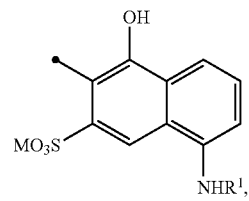
(g)

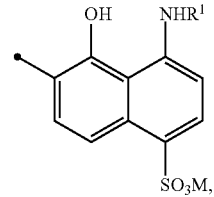
(h)

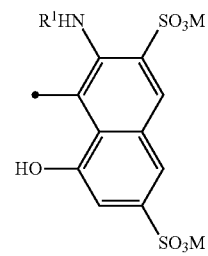
(i)

-continued (j)
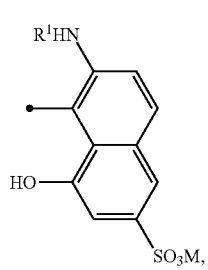

(k)
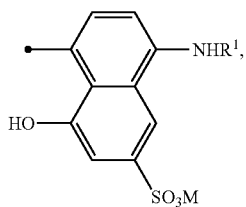

(l)
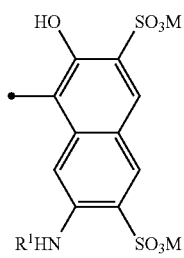

In the general formula (1), the aryl group represented by $Q^1$ may be a condensed-ring group in which two or more benzene rings are condensed, such as a naphthyl group besides a phenyl group.

The arylene group represented by $Q^2$ may be a condensed-ring group in which two or more benzene rings are condensed, such as a naphthylene group besides a phenylene group.

The aryl group of $Q^1$ or the arylene group of $Q^2$ may or may not each have a substituent group. Whether the aryl group or the arylene group is substituted or non-substituted, the aromatic disazo compound of the general formula (1) having a polar group has excellent solubility in an aqueous solvent.

When the aryl group or the arylene group has a substituent group, the substituent group includes, for example, an alkyl group with a carbon number of 1 to 6, an alkoxy group with a carbon number of 1 to 6, an alkylamino group with a carbon number of 1 to 6, a phenylamino group, an acylamino group with a carbon number of 1 to 6, a hydroxyalkyl group with a carbon number of 1 to 6 such as a dihydroxypropyl group, a carboxyl group such as a COOM group and the like, a sulfonic acid group such as a $SO_3M$ group, a hydroxyl group, a cyano group, a nitro group, an amino group, a halogeno group, and the like. Preferably, the substituent group is the one selected from an alkoxy group with a carbon number of 1 to 6, a hydroxyalkyl group with a carbon number of 1 to 6, a carboxyl group, a sulfonic acid group, and a nitro group. The aromatic disazo compound having such a substituent group is particularly excellent in water solubility. These substituent groups may be substituted with one kind or with two or more kinds. Also, the substituent groups may be substituted at an arbitrary ratio.

$Q^1$ in the general formula (1) is preferably a substituted or non-substituted phenyl group, more preferably a phenyl group having the substituent group.

The $Q^2$ is preferably a substituted or non-substituted naphthylene group, more preferably a naphthylene group having the substituent group, particularly preferably a 1,4-naphthylene group having the substituent group.

An aromatic disazo based compound in which $Q^1$ in the general formula (1) is a substituted or non-substituted phenyl group and $Q^2$ is a substituted or non-substituted 1,4-naphthylene group is represented by the following general formula (2).

(2)
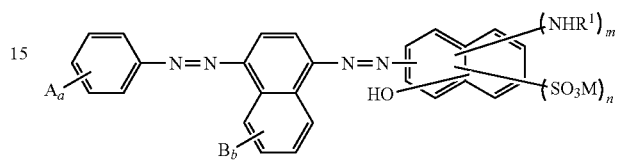

$R^1$, M, m, and n in the general formula (2) are the same as those in the general formula (1).

In the general formula (2), A and B represent a substituent group, and a and b represent a substitution number thereof. The A and B independently represent an alkyl group with a carbon number of 1 to 6, an alkoxy group with a carbon number of 1 to 6, an alkylamino group with a carbon number of 1 to 6, a phenylamino group, an acylamino group with a carbon number of 1 to 6, a hydroxyalkyl group with a carbon number of 1 to 6 such as a dihydroxypropyl group, a carboxyl group such as a COOM group, a sulfonic acid group such as a $SO_3M$ group, a hydroxyl group, a cyano group, a nitro group, an amino group, a halogeno group. Further, a represents an integer of 0 to 5, and b represents an integer of 0 to 4. However, at least one of a and b is not 0. When a is 2 or more, the substituent groups A may be the same or different. When b is 2 or more, the substituent groups B may be the same or different.

Among the aromatic disazo compounds included in the general formula (2), it is preferable to use the aromatic disazo compound shown in the following general formula (3). In the aromatic disazo compound of the general formula (3), the substituent group A is bonded to the para-position with the azo group (—N=N—) serving as a standard. Further, in the aromatic disazo compound of the general formula (3), the OH group of the naphthyl group thereof is bonded to a position adjacent to the azo group (ortho position). When such an aromatic disazo compound of the general formula (3) is used, a polarizing plate having a high polarization degree can be obtained.

(3)
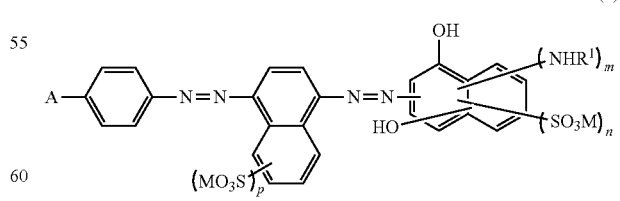

$R^1$, M, m, and n in the general formula (3) are the same as those in the general formula (1), and A is the same as the one in the general formula (2).

In the general formula (3), p represents an integer of 0 to 4. Further, p is preferably 1 or 2, more preferably 1.

The aromatic disazo compound shown in the above general formulae (1) to (3) can be synthesized according to, for example, "Riron Seizo Senryo Kagaku (Theoretical Production, Dye Chemistry) $5^{th}$ edition" by Yutaka Hosoda, published on Jul. 15, 1968, GIHODO SHUPPAN Co., Ltd., pages 135 to 152.

For example, the aromatic disazo compound of the above general formula (3) can be synthesized by obtaining a monoazo compound through diazotization and coupling reaction between an aniline derivative and a naphthalene sulfonic acid derivative, after that, this monoazo compound further goes through diazotization and further a coupling reaction with 1-amino-8-naphthol sulfonic acid derivative.

[Alignment Layer]

The alignment layer functions to align the organic dyes contained in the coating liquid in a predetermined direction when the coating liquid containing the organic dyes and a solvent is applied on the alignment layer. The alignment layer contains a cycloolefin based resin. A cycloolefin based resin is a polymer containing an alicyclic ring in its molecule.

The content of the cycloolefin based resin in an alignment layer is not particularly limited, and is preferably 50% by mass or more of all alignment layer, more preferably 70% by mass or more, further preferably 80% by mass or more, particularly preferably 90% or more.

In the case where the content of the cycloolefin based resin falls below 50% by mass, there is a possibility that the alignment layer cannot satisfactorily align an organic dye.

In each of a plurality of alicyclic rings forming the cycloolefin based resin, the number of ring-forming carbon atoms in the alicyclic ring is not particularly limited, but is usually 4 or more, and is preferably 5 or more. The number of carbon atoms contained in one alicyclic ring is usually 15 or less, and is preferably 12 or less. The number of carbon atoms in one alicyclic ring less than 4 results in a too rigid cycloolefin based resin, and may thus create difficulties in providing the alignment layer with an alignment regulating force by an alignment treatment. Conversely, the number of carbon atoms contained in one alicyclic ring more than 15 results in a too soft cycloolefin based resin, and may thus cause an uneven alignment regulating force to be provided. Note that the singular form of "alicyclic ring" represents any one of a plurality of alicyclic rings forming the cycloolefin based resin unless the context clearly dictates otherwise.

The alicyclic ring may be unsubstituted or substituted with any substituent. Examples of substituent included in the alicyclic ring include an alkyl group, an aryl group, and an alkylenearyl group. The number of carbon atoms contained in each of these substituents is usually 1 to 8, and the carbon chains in these substituents may be linear or branched.

The alicyclic ring may have a saturated cyclic hydrocarbon (cycloalkane) structure or an unsaturated cyclic hydrocarbon (cycloalkene) structure, but preferably has a cycloalkane structure from a viewpoint of properties such as mechanical strength, heat-resisting properties, and alignment performance on the organic dye.

The cycloolefin based resin may further include other structural unit without any alicyclic ring in addition to the alicyclic ring. For example, the cycloolefin based resin may be copolymerized with conjugated dienes, various substituted vinyl compounds, α-olefins, and the like.

If the cycloolefin based resin includes both the alicyclic ring and other structural unit, the content of the alicyclic ring is not particularly limited, but the alicyclic ring preferably accounts for 50 mol % or more, more preferably 70 mol % or more, particularly preferably 90 mol % or more, with respect to the entire cycloolefin based resin. A content of the alicyclic ring less than 50 mol % with respect to the entire cycloolefin based resin results in a too rigid cycloolefin based resin, and may thus create difficulties in providing the alignment layer with an alignment regulating force by an alignment treatment.

The cycloolefin based resin can be obtained by, for example, polymerization of a cycloolefin or copolymerization of cycloolefins. Examples of the cycloolefin include unsaturated hydrocarbons each having a polycyclic structure, such as bicyclo[2.2.1]hept-2-ene (trivial name: norbornene), tricyclo[4.3.0$^{1.6}$.1$^{2.5}$]deca-3,7-diene (trivial name: dicyclopentadiene), tetracyclo[4.4.0.1$^{2.5}$ 1$^{7.10}$]dodeca-3-en (trivial name: tetracyclododecene), and derivatives thereof (such as those having a substituent on the ring); unsaturated hydrocarbons each having a monocyclic structure, such as cyclobutene, cyclopentene, cyclohexene, 3,4-dimethylcyclopentene, 3-methylcyclohexene, 2-(2-methylbutyl)-1-cyclohexene, cyclooctene, cycloheptene, cyclopentadiene, cyclohexadiene, and derivatives thereof.

Examples of monomer copolymerizable with a cycloolefin include, for example, olefins, such as ethylene, propylene, 1-butene, and 1-pentene; and dienes, such as 1,4-hexadiene, 4-methyl-1,4-hexadiene, 5-methyl-1,4-hexadiene, and 1,7-octadiene.

The alignment layer containing the cycloolefin based resin has a high alignment regulating force. Therefore, the organic dye can be aligned to a sufficient degree. Thus, the use of an alignment layer containing a cycloolefin based resin can provide a polarizing plate having excellent light polarization properties.

The present inventors infer one reason why an alignment layer containing a cycloolefin based resin has a high alignment regulating force as follows.

The level of an alignment regulating force of an alignment layer primarily depends on two factors: (a) change in geometry of the treatment surface caused by an alignment treatment, and (b) chemical structure of molecules exposed on the treatment surface.

A cycloolefin based resin contains an alicyclic ring, and has therefore high flexibility. Thus, a mechanical alignment treatment, such as a rubbing treatment, is likely to result in formation of fine grooves. In other words, the alignment treatment is likely to cause a change in geometry of the surface. In addition, the alicyclic ring, which is a chemical structure of the molecule of the cycloolefin based resin, is unlikely to disturb alignment of the organic dye. Thus, due to the combined effect of a change in geometry of the treatment surface and of the chemical structure of the molecules, the alignment layer containing a cycloolefin based resin has a high alignment regulating force, and can thus suitably align the organic dye.

In the present invention, the cycloolefin based resin is preferably a norbornene based resin. As used herein, the term "norbornene based resin" refers to a polymer or copolymer obtained by using a norbornene based monomer having a norbornene skeleton in a portion or all of the starting material (monomer).

A norbornene based resin is thought to be particularly unlikely to disturb alignment of the organic dye due to the chemical structure of its molecules. Thus, use of a norbornene based resin enables an alignment layer to be formed that is capable of even more suitably aligning the organic dye.

The cycloolefin based resin in the present invention may be crystalline or amorphous, but is preferably amorphous.

As used herein, the phrase "amorphous cycloolefin based resin" refers to a cycloolefin based resin that exhibits no exothermic peak associated with crystallization, or exhibits an exothermic peak associated with crystallization and has a heat of crystal fusion of 10 J/g or less (i.e., has a significantly low degree of crystallinity).

Use of an amorphous cycloolefin based resin can more suitably align the organic dye, and can thus provide a polarizing plate having excellent light polarization properties. The present inventors infer the reason therefor as follows.

An amorphous cycloolefin based resin has a lower degree of crystallinity than that of a crystalline cycloolefin based resin. In other words, the molecules in an amorphous cycloolefin based resin are less regularly aligned than the molecules in a crystalline cycloolefin based resin, and can thus be randomly dispersed.

A crystalline cycloolefin based resin is characterized in that the crystal structure, which is the chemical structure of its molecules, is likely to inhibit formation of fine grooves caused by a mechanical alignment treatment, and that the crystal structure itself is likely to disturb alignment of the organic dye. In contrast, an amorphous cycloolefin based resin is characterized in that its molecules can be randomly dispersed, and that the amorphous structure, which is the chemical structure of the molecules, is thus unlikely to inhibit formation of fine grooves caused by a mechanical alignment treatment, and the amorphous structure itself is unlikely to disturb alignment of the organic dye. Thus, an alignment layer containing an amorphous cycloolefin based resin is capable of even more suitably aligning the organic dye than an alignment layer containing a crystalline cycloolefin based resin.

Specific examples of the amorphous cycloolefin based resin include, for example, (1) amorphous norbornene based resins, (2) monocyclic amorphous cycloolefin based resins, (3) amorphous cyclic conjugated diene based resins, and (4) hydrogenated products thereof.

(1) Amorphous Norbornene Based Resin

An amorphous norbornene based resin can be obtained by either ring-opening polymerization or addition polymerization of a norbornene based monomer.

Examples of the amorphous norbornene based resin obtainable by ring-opening polymerization include resins obtained by ring-opening polymerization of only a norbornene based monomer, resins obtained by ring-opening polymerization of a norbornene based monomer and other monomer, and hydrogenated products thereof.

Examples of the amorphous norbornene based resin obtainable by addition polymerization include resins obtained by addition polymerization of only a norbornene based monomer, resins obtained by addition polymerization of a norbornene based monomer and other monomer, and hydrogenated products thereof.

Examples of the norbornene based monomer include, for example, norbornene, dicyclopentadiene, methanotetrahydrofluorene, and tetracyclododecene, and derivatives thereof.

These norbornene based monomers may be used alone or in combination of two or more kinds.

A ring-opened polymer formed of only a norbornene based monomer, or a ring-opened polymer formed of a norbornene based monomer and other monomer, can be obtained by polymerizing the monomeric components described above in the presence of a well-known ring-opening polymerization catalyst. A ring-opening polymerization catalyst may be, for example, a catalyst formed of a halogenated metal compound and an organic aluminum compound.

Examples of other monomer that is ring-opening copolymerizable with the norbornene based monomer include, for example, monocyclic olefin monomers, such as cyclohexene, cycloheptene, and cyclooctene.

These ring-opened polymers may be hydrogenated. A ring-opened polymer can be hydrogenated by, for example, using a well-known hydrogenation catalyst containing transition metal, such as nickel or palladium, upon the ring-opening polymerization of a norbornene based monomer.

An addition polymer formed of only a norbornene based monomer, or an addition polymer formed of a norbornene based monomer and other monomer, can be obtained by polymerizing the monomeric components described above in the presence of a well-known addition polymerization catalyst. An addition polymerization catalyst may be, for example, a catalyst formed of a vanadium compound and an organic aluminum compound.

Examples of other monomer that is addition copolymerizable with the norbornene based monomer include, for example, α-olefins, such as ethylene, propylene, 1-butene, 1-pentene, and 1-hexene, and derivatives thereof, cycloolefins, such as cyclobutene, cyclopentene, cyclohexene, cyclooctene, and 3a,5,6,7a-tetrahydro-4,7-methano-1H-indene, and derivatives thereof, and non-conjugated dienes, such as 1,4-hexadiene, 4-methyl-1,4-hexadiene, 5-methyl-1,4-hexadiene, and 1,7-octadiene, and derivatives thereof. Among these, α-olefins are preferred, and ethylene is particularly preferred.

These addition polymers may be hydrogenated. An addition polymer can be hydrogenated by, for example, using a well-known hydrogenation catalyst containing transition metal, such as nickel or palladium, upon the addition polymerization of a norbornene based monomer.

(2) Monocyclic Amorphous Cycloolefin Based Resin

Examples of the monocyclic amorphous cycloolefin based resin include, for example, addition polymers of monocyclic cycloolefin monomers, such as cyclohexene, cycloheptene, and cyclooctene, and hydrogenated products thereof.

(3) Amorphous Cyclic Conjugated Diene Based Resin

Examples of the amorphous cyclic conjugated diene based resin include, for example, polymers obtained by 1,2- or 1,4-addition polymerization of cyclic conjugated diene based monomers, such as cyclopentadiene and cyclohexadiene, and hydrogenated products thereof.

Among the amorphous cycloolefin based resins exemplified above, amorphous norbornene based resins and hydrogenated products thereof are preferably used.

Amorphous norbornene based resins are thought to be particularly unlikely to disturb alignment of the organic dye due to their molecular structure, and are thus capable of particularly suitably aligning the organic dye.

In particular, the amorphous cycloolefin based resin preferably has a repeating unit including a norbornene skeleton represented by the general formula (4) shown below.

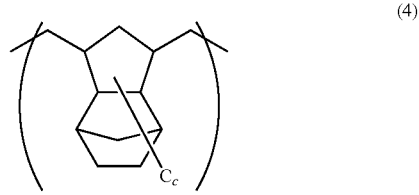

(4)

In the general formula (4), C represents a substitute of a norbornene skeleton and c represents number of substitutions thereof. C independently represents an alkyl group with a carbon number of 1 to 6, an alkoxy group with a carbon number of 1 to 6, an alkylamino group with a carbon number of 1 to 6, a phenylamino group, an acylamino group with a carbon number of 1 to 6, a hydroxyalkyl group with a carbon number of 1 to 6 such as a dihydroxypropyl group, a carboxyl group such as a COOM group and the like, a sulfonic acid group such as a $SO_3M$ group, a hydroxyl group, a cyano group, a nitro group, an amino group, and a halogeno group. The aforementioned c represents an integer of 0 to 12. When the aforementioned c is 2 or more, the substituent group C may be the same or different. The aforementioned c is preferably 0 to 5, more preferably 0 to 2, particularly preferably 0 (that is, unsubstituted). In the general formula (4), C does not represent a carbon atom.

When the amorphous cycloolefin based resin has a repeating unit including a norbornene skeleton represented by the general formula (4) shown above, the amorphous cycloolefin based resin preferably also has at least one of the repeating units represented by the general formula (5) and the general formula (6) shown below, and more preferably, the amorphous cycloolefin based resin has both the repeating units represented by the general formula (5) and the general formula (6).

When the amorphous cycloolefin based resin has at least one of the repeating unit of the general formula (5) and/or the repeating unit of the general formula (6) in addition to the repeating unit of the general formula (4), these repeating units may be copolymerized with each other or merely contained in a mixed manner without being copolymerized (in other words, the polymer having the repeating unit of the general formula (4) and the polymer having the repeating unit of the general formula (5) and/or the polymer having the repeating unit of the general formula (6) are mixed).

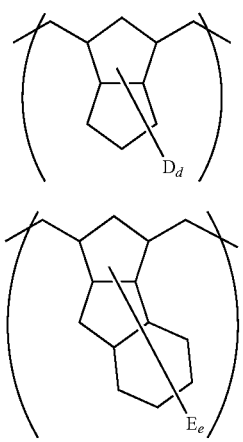

(5)

(6)

In the general formulae (5) and (6), D and E are the same as C in the general formula (4). D and E may be the same substituent group or different substituent group from each other.

In the general formula (5), d represents number of substitutions of D. d represents an integer of 0 to 10, preferably 0 to 5, more preferably 0 to 3, particularly preferably 0. When the aforementioned d is 2 or more, the aforementioned D may be the same or different.

In the general formula (6), e represents number of substitutions of E. e represents an integer of 0 to 16, preferably 0 to 8, more preferably 0 to 4, particularly preferably 0. When the aforementioned e is 2 or more, the aforementioned E may be the same or different.

The weight average molecular weight (MwA) of the cycloolefin based resin is not particularly limited, but is usually in a range of 20,000 to 150,000, preferably from 25,000 to 100,000, more preferably from 25,000 to 60,000, particularly preferably from 30,000 to 40,000.

A weight average molecular weight (MwA) is a value as determined by gel permeation chromatography (GPC) with a right angle laser light scattering detector.

The alignment layer may be an anisotropic alignment layer, which is optically anisotropic, or an isotropic alignment layer, which is substantially optically isotropic. However, the alignment layer is preferably an isotropic alignment layer. If the alignment layer is substantially optically isotropic, optical characteristics of the entire polarizing plate are not affected by the optical characteristics of the alignment layer. Therefore, the optical characteristics of the entire polarizing plate can be controlled as desired by replacing the substrate and/or the polarizing layer (organic dye). A substantially optically isotropic alignment layer can be formed by using an amorphous cycloolefin based resin, and in particular can be readily formed by using an amorphous norbornene based resin.

As used herein, the phrase "substantially optically isotropic" not only indicates that the refractive index ellipsoid of the alignment layer has a relationship of nx=nz=ny, but is also intended to include cases of nx≈nz≈ny. More specifically, the phrase "substantially optically isotropic" also indicates that the absolute value of the in-plane birefringence Δnxy (Δnxy=nx−ny) of the alignment layer, and the absolute value of the thickness-wise birefringence (i.e., birefringence along the thickness direction) Δnxz (Δnxz=nx−nz), are each 0.0005 or less. These absolute values are each preferably 0.0001 or less, more preferably 0.00005 or less.

As used herein, the parameter "nx" represents the refractive index in a direction in which the in-plane refractive index of the layer to be used in evaluation (herein the alignment layer) is the highest at a temperature of 23° C. and a wavelength of 590 nm (this direction is defined as X-axis direction); the parameter "ny" represents the refractive index in a direction perpendicular to the X-axis direction on that plane (Y-axis direction); and the parameter "nz" represents the refractive index in a direction perpendicular to both the X-axis direction and the Y-axis direction (thickness direction).

The thickness of the alignment layer is not particularly limited, but is usually in a range of 2 μm to 50 μm, preferably 2 μm to 20 μm, particularly preferably 2 μm to 10 μm.

When the alignment layer is an isotropic alignment layer, the value of its in-plane retardation value (Re) is preferably in a range of −30 nm to 30 nm, more preferably from −20 nm to 20 nm, particularly preferably from −10 nm to 10 nm; and the value of its thickness-wise retardation (i.e., retardation along the thickness direction) (Rth) is preferably in a range of −30 nm to 30 nm, more preferably from −20 nm to 20 nm, particularly preferably from −10 nm to 10 nm.

As used herein, a value of in-plane retardation value (Re) is the value of retardation on the plane of the alignment layer determined at a temperature of 23° C. using light at a wavelength of 590 nm. The value of in-plane retardation value (Re) can be calculated using an equation: Re=(nx−ny)·d, wherein d (nm) represents the thickness of the alignment layer.

A value of thickness-wise retardation (Rth) is the value of retardation along the thickness direction of the alignment layer determined at a temperature of 23° C. using light at a wavelength of 590 nm. The value of thickness-wise retardation (Rth) can be calculated using an equation: Rth=(nx−nz)·d, wherein d (nm) represents the thickness of the alignment layer.

[Substrate]

The substrate exists under both the alignment layer and the polarizing layer, and supports these two layers. Note that the polarizing plate of the present invention may not include a substrate.

The substrate material is not particularly limited. Examples of the substrate include a glass substrate, a quartz substrate, a resin film, a liquid crystal film, and a silicon substrate. The substrate is preferably a glass substrate or a resin film, particularly preferably a resin film.

Any suitable glass substrate may be used as the glass substrate. Examples of the glass substrate include soda lime (blue sheet) glass containing an alkali component, and low-alkali borosilicate glass.

The formation material of the resin film is not particularly limited, and any suitable material may be used. However, it is preferable that the resin film (substrate) contains substantially no cycloolefin based resin.

As used herein, the phrase "contain(s) substantially no cycloolefin based resin" not only means that no cycloolefin based resin is contained in the substrate, but also means that 3% by mass or less of a cycloolefin based resin may be present in the substrate.

Concerning the formation material of the resin film, the resin film is preferably a film containing a thermoplastic polymer. Examples of the thermoplastic polymer include polyolefin based, polyvinyl chloride based, cellulose based, styrene based, polymethyl methacrylate based, polyvinyl acetate based, polyvinylidene chloride based, polyamide based, polyacetal based, polycarbonate based, polybutylene terephthalate based, polyethylene terephthalate based, polysulfone based, polyether sulfone based, polyarylate based, and polyimide based polymers. These thermoplastic polymers may be used alone or in combination of two or more kinds. A highly transparent polymer film (e.g., film having a haze value of 5% or less) is preferably used.

The thickness of the substrate is not particularly limited. From a viewpoint of reduction in thickness and weight, the thickness of the substrate is preferably 300 μm or less, more preferably 5 μm to 200 μm, still more preferably 10 μm to 100 μm.

The glass transition temperature (Tg) of the resin constituting the resin film is not particularly limited, but is preferably 180° C. or less, more preferably 150° C. or less, still more preferably 120° C. or less, particularly preferably 100° C. or less. A glass transition temperature can be determined by the differential scanning calorimetry (DSC) method compliant to JIS K 7121 (1987).

In general, resin having a low glass transition temperature tends to have a lower crystallinity and a higher transmittance than those of resin having a high glass transition temperature (above 180° C.). Therefore, use of resin having a glass transition temperature of 180° C. or less as the formation material of the substrate permits a polarizing plate having a high transmittance to be formed.

Note that a typical alignment layer requires high temperature firing during its formation process. For example, an alignment layer containing polyimide typically requires high temperature firing at a temperature around 200° C. to polyimidize the polyamic acid. Since the glass transition temperature of a resin film is low in general, formation of an alignment layer requiring such high temperature firing on the substrate (resin film) may cause deformation and/or deterioration in the substrate due to the high temperature firing, which is not desirable.

In contrast, the alignment layer of the present invention can be formed even on a substrate having a glass transition temperature of 180° C. or less without causing deformation or deterioration in the substrate.

The substrate may be an anisotropic substrate having anisotropic optical characteristics (e.g., a retardation film), or an isotropic substrate having substantially isotropic optical characteristics. Optical characteristics of the substrate may be changed as appropriate in consideration of the application of the polarizing plate, etc. As used herein, the phrase "anisotropic optical characteristics" indicates that the refractive index ellipsoid of the substrate has neither a relationship of nx=ny=nz nor a relationship of nx≈ny≈nz.

When the substrate 2 includes two layers, i.e., the base layer 21 and the retardation layer 22 as illustrated in FIG. 4, the base layer 21 can be formed using a similar material to the formation material of the substrate as exemplified above. The retardation layer 22 may be any conventionally known optical retardation film.

The surface of the substrate may have releasability. Releasability of the surface of the substrate allows easy release, from the substrate, of the laminate including the alignment layer and the polarizing layer formed on the surface of the substrate, and thus allows attachment of the laminate to an adherend. Attachment of the laminate to an adherend can form another polarizing plate including the alignment layer, the polarizing layer, and the adherend.

The releasability may be inherent nature of the formation material of the substrate itself, or may be provided to the substrate surface by a releasability-imparting treatment.

For example, a polyethylene terephthalate based resin has low adhesion to a cycloolefin based resin, and therefore, use of a polyethylene terephthalate based film as the substrate provides the substrate surface with releasability from the alignment layer (a cycloolefin based resin). Examples of the releasability-imparting treatment include application of silicone on the substrate surface.

Examples of the adherend include a glass sheet; a liquid crystal panel; general resin films containing resins such as triacetyl cellulose based resins, polycarbonate based resins, and polyolefin based resins; optical retardation films, such as a quarter-wavelength retardation plate and a three-quarter-wavelength retardation plate; and substrates having releasability similar to those described above. The structure of the polarizing plate formed by attaching a laminate to the adherend will be described in detail in the section titled [Application of polarizing plate] given below.

The polarizing plate of the present invention includes an alignment layer containing cycloolefin based resin, and a polarizing layer formed on this alignment layer. Since an alignment layer containing cycloolefin based resin has a high alignment regulating force, the polarizing plate of the present invention has excellent light polarization properties.

Moreover, since the alignment layer of the present invention contains cycloolefin based resin, the alignment layer can be formed without high temperature firing of the coating film. Thus, the alignment layer containing cycloolefin based resin can be applied also on a substrate having a relatively low glass transition temperature (Tg). In other words, the alignment layer containing cycloolefin based resin can be applied on various types of substrates.

[Method for Producing a Polarizing Plate]

The method for producing a polarizing plate of the present invention includes at least steps A to C and steps E and F described below. Step G set forth below may be performed after step F as needed. Step D set forth below may be performed after step C and before step E as needed.

Step A: A first coating liquid containing the aforementioned cycloolefin based resin is applied to form a first coating film.

Step B: The first coating film is dried to form a first dry coating film.

Step C: An alignment treatment is performed on a surface of the first dry coating film to form an alignment layer.

Step D: A hydrophilization treatment is performed on a surface of the alignment layer formed in step C.

Step E: A second coating liquid containing the organic dyes is applied on the alignment layer to form a second coating film.

Step F: The second coating film is dried to form a second dry coating film as a polarizing layer.

Step G: A water-resistant treatment is performed on a surface of the polarizing layer formed in step E.

<Step A>

The first coating liquid contains a cycloolefin based resin and a solvent dissolving or dispersing the cycloolefin based resin. The cycloolefin based resin contained in the first coating liquid is not particularly limited, and may be one of those exemplified above. The first coating liquid can be obtained by dissolving or dispersing the cycloolefin based resin in the solvent.

Polymers other than a cycloolefin based resin and/or optional additives and the like may be added to the solvent as needed.

The solvent is not particularly limited, and may be a conventionally known solvent. However, an organic solvent is preferred. The organic solvent preferably has low miscibility with water, and is capable of dissolving a cycloolefin based resin. Examples of such organic solvent include aliphatic hydrocarbons, such as cyclohexane, pentane, and hexane; aromatic hydrocarbons, such as benzene, toluene, and chlorobenzene; ethers, such as tetrahydrofuran (THF), diethyl ether, and ethylene glycol diethyl ether; ketones, such as acetone, methyl ethyl ketone, and 4-methyl-2-pentanone; and esters, such as methyl propionate, ethyl acetate, and butyl acetate. Among others, preference is given to highly polar aprotic solvents, such as N-methyl pyrrolidone (NMP), N,N-dimethyl formamide (DMF), N,N-dimethyl acetamide (DMAc), and dimethyl sulfoxide (DMSO). These materials may be used alone or in combination.

The concentration of the cycloolefin based resin in the first coating liquid is not particularly limited, and is, for example, 5% by mass to 50% by mass, preferably 10% by mass to 50% by mass, particularly preferably 10% by mass to 30% by mass.

Application of the first coating liquid leads to formation of the first coating liquid having a film-like structure, which is the first coating film.

The method of applying the first coating liquid is not particularly limited. For example, an application technique using a conventionally known coater may be used. Examples of such coater include a bar coater, a roll coater, a spin coater, a comma coater, a gravure coater, an air knife coater, and a die coater.

The object on which the first coating liquid is applied (i.e., applied surface) is not particularly limited, but is preferably the aforementioned substrate. The surface of the substrate may or may not have releasability. In the following section setting forth an example of the method for producing a polarizing plate, the steps performed after step A are described on the assumption that the first coating liquid has been applied on the surface of the substrate in step A.

<Step B>

Drying the first coating film causes volatilization of the solvent contained in the first coating film, and thus a layer containing a solid cycloolefin based resin (i.e., first dry coating film) is formed.

The technique for drying is not particularly limited, but natural drying or forced drying may be used. Techniques of forced drying include, for example, vacuum drying, heat drying, and vacuum heat drying. Preferably, natural drying is used.

The drying time may be suitably selected depending on the drying temperature and/or the solvent used. For example, the drying time for natural drying is preferably 1 second to 120 minutes, more preferably 10 seconds to 5 minutes.

The drying temperature is not particularly limited, but is preferably lower than the glass transition temperature (Tg) of the substrate. A drying temperature above the glass transition temperature of the substrate may cause a change in characteristics (e.g., mechanical strength and optical characteristics) of the substrate. More specifically, the drying temperature is preferably in a range of 10° C. to 100° C., more preferably 10° C. to 90° C., particularly preferably 10° C. to 80° C.

Note that, as used herein, the drying temperature refers to the temperature of the atmosphere used to dry the first coating film, not the temperature of a surface or the inside of the first coating film.

In the present invention, the use of a cycloolefin based resin as the formation material of the alignment layer eliminates the need to fire the first coating film at a high temperature to form the alignment layer.

<Step C>

Performing an alignment treatment on the surface of the first dry coating film leads to formation of the alignment layer (the first dry coating film becomes the alignment layer by an alignment treatment). The alignment treatment may be a mechanical alignment treatment or a chemical alignment treatment.

A mechanical alignment treatment provides an alignment regulating force to the surface of the first dry coating film by bringing the treatment material into contact with the surface. Examples thereof include a rubbing treatment. The rubbing treatment uses, as the treatment material, a rubbing cloth having a vast number of pile elements upstanding thereon. Rubbing the surface of the first dry coating film with a rubbing cloth can provide an alignment regulating force to the surface of the first dry coating film.

Meanwhile, a chemical alignment treatment provides an alignment regulating force to the surface of the first dry coating film by means having no contact with the first dry coating film. Examples thereof include an alignment treatment using photochemical reaction. The alignment treatment using photochemical reaction can be carried out by preliminarily including the aligning agent in the first coating liquid, and then irradiating the first dry coating film with light. Examples of the aligning agent include a polymer having a photoreactive functional group generating photochemical reaction. Examples of photochemical reaction include photoisomerization reaction, ring opening/closing reaction under light illumination, photodimerization reaction, photolysis reaction, and photo-fries rearrangement reaction.

The alignment treatment is preferably a mechanical alignment treatment, and is more preferably a rubbing treatment. This preference is due to the need to add the aligning agent in the first coating liquid in advance if a chemical alignment treatment is used. The chemical structure of molecules of this aligning agent may then disturb alignment of the organic dye.

<Step D>

Performing a hydrophilization treatment on the surface of the alignment layer can impart hydrophilicity to the alignment layer.

The hydrophilization treatment may be, for example, a dry-type treatment or a wet-type treatment. Examples of the dry-type treatment include an electrical discharge treatment, such as a corona treatment, a plasma treatment, and a glow discharge treatment; a flame treatment; an ozone treatment; a UV-ozone treatment; and an ionizing radiation treatment, such as a UV light treatment. Examples of the wet-type treatment include an ultrasound treatment using a solvent, such as water or acetone; an alkali treatment; and an anchor coating processing. These types of treatment may be used alone or in combination of two or more kinds.

The hydrophilization treatment can preferably be at least one selected from the group of a corona treatment, a plasma treatment, and a UV-ozone treatment. Performing such hydrophilization treatment can reliably provide electric polarization to the surface of the alignment layer.

<Step E>

The second coating liquid contains organic dyes and a solvent dissolving or dispersing the organic dyes. The organic dyes contained in the second coating liquid are not particularly limited as long as the organic dyes have lyotropic liquid crystallinity and can form supramolecular aggregates. The second coating liquid can be obtained by dissolving or dispersing the organic dyes in the solvent.

Polymers other than the organic dye and/or optional additives and the like may be added to the solvent as needed.

The solvent is not particularly limited, but the conventionally known solvent can be used and an aqueous solvent is preferably used. Examples of the aqueous solvent include water, a hydrophilic solvent, and a mixed solvent containing water and the hydrophilic solvent. The hydrophilic solvent is a solvent that can be dissolved in water approximately uniformly. Examples of the hydrophilic solvent include alcohols such as methanol, isopropyl alcohol, and the like; glycols such as ethylene glycol, and the like; cellosolves such as methyl cellosolve, ethyl cellosolve, and the like; ketones such as acetone, methyl ethyl ketone, and the like; esters such as ethyl acetate and the like. The aqueous solvent is preferably water or the mixed solvent containing water and the hydrophilic solvent.

A second coating liquid exhibits a lyotropic liquid crystal phase by changing the temperature or the concentration of organic dyes and the like. The lyotropic liquid crystal phase is exhibited by the organic dyes forming spramolecular aggregates in the liquid. The lyotropic liquid crystal phase can be confirmed and identified from an optical pattern when observed by using a polarization microscope.

The concentration of the organic dye in the second coating liquid is preferably adjusted so that the organic dye exhibits a liquid crystal phase. The concentration of the organic dye in the second coating liquid is typically in a range of 0.05% by mass to 50% by mass, preferably 0.5% by mass to 40% by mass, more preferably 2% by mass to 30% by mass.

The second coating liquid is also adjusted to have a suitable pH. The pH of the second coating liquid is preferably in a range of about pH 2 to 10, more preferably about pH 6 to 8.

The temperature of the second coating liquid is preferably adjusted in a range of 10° C. to 40° C., more preferably 15° C. to 30° C.

Application of the second coating liquid leads to formation of the second coating liquid having a film-like structure, which is the second coating film. In the second coating film, the organic dye is aligned in the predetermined direction due to the alignment regulating force of the surface of the alignment layer.

The method of applying the second coating liquid is not particularly limited, and the same methods as those of the first coating liquid described above can be employed.

<Step F>

Drying the second coating film causes volatilization of the solvent contained in the second coating film, and thus the second dry coating film (i.e., polarizing layer) containing the solid organic dye is formed. In the polarizing layer, the organic dye has its alignment being fixed while supramolecular aggregates are still present therein.

Performing step F completes the formation of the polarizing plate including the substrate, the alignment layer, and the polarizing layer stacked from bottom to top.

The technique and conditions for drying the second coating film are not particularly limited. The second coating film can be dried using a technique and conditions similar to those used in step B.

<Step G>

The polarizing layer can obtain water resistance by bringing water resistant treatment liquid into contact with the polarizing layer.

The technique to bring the water-resistant treatment liquid into contact with the polarizing layer is not particularly limited. Examples of the contacting technique include (a) application of water-resistant treatment liquid on the surface of the polarizing layer, (b) immersion of the polarizing plate in a bath filled with water-resistant treatment liquid, and (c) passing the polarizing plate through a bath filled with water-resistant treatment liquid. The application of water-resistant treatment liquid set forth as technique (a) can be carried out by using a suitable coater, spray, or similar means.

Among these techniques, either (b) immersion of the polarizing plate in a bath filled with water-resistant treatment liquid, or (c) passing the polarizing plate through a bath filled with water-resistant treatment liquid, is preferred. These techniques permit the water-resistant treatment liquid to reliably contact with the entire surface of the polarizing layer, and also permit the water-resistant treatment liquid to readily soak into the polarizing layer.

The water-resistant treatment liquid is preferably allowed to soak into the polarizing layer to a sufficient degree so that the surface of the polarizing layer of the polarizing plate is sufficiently wet immediately after the water-resistant treatment. Among others, each of the techniques (b) and (c) allows the water-resistant treatment liquid to soak into the polarizing layer to a sufficient degree, and moreover, allows a polarizing layer to be obtained whose surface is wet with a sufficient amount of water-resistant treatment liquid immediately after the polarizing plate is taken out of the treatment bath.

The water-resistant treatment liquid is not particularly limited, and a conventionally known material can be used. The water-resistant treatment liquid includes, for example, a crosslinking agent capable of crosslinking organic dyes, and a solvent dissolving or dispersing the crosslinking agent.

Examples of the crosslinking agent include an organic nitrogen compound, and examples of the solvent include an aqueous solvent.

The organic nitrogen compound is preferably an acyclic organic nitrogen compound having two or more cationic groups (preferably cationic groups each having a nitrogen atom) in the molecule. Examples of the acyclic organic nitrogen compound (acyclic aliphatic nitrogen compound) include aliphatic diamines such as alkylene diamines, and salts thereof aliphatic triamines such as alkylene triamines, and salts thereof, aliphatic tetraamines such as alkylene tetraamines, and salts thereof, aliphatic pentaamines such as alkylene pentaamines, and salts thereof, and aliphatic ether diamines such as alkylene ether diamines, and salts thereof.

The aqueous solvent may be one of those exemplified in the step D section.

The concentration of the crosslinking agent in the water-resistant treatment liquid is preferably in a range of 1% by mass to 50% by mass, more preferably 5% by mass to 30% by mass.

Bringing the water-resistant treatment liquid into contact with the polarizing layer causes the organic dyes in the polarizing layer to be crosslinked via the crosslinking agent. This crosslinking process can form a polarizing layer having excellent water resistance and mechanical strength.

[Application of Polarizing Plate]

The polarizing plate of the present invention is preferably incorporated in an image display. Examples of image display incorporating the polarizing plate of the present invention include liquid crystal display devices, organic EL displays, and plasma displays. A preferred application of the image display device is a television set.

When the polarizing plate of the present invention includes the substrate, the polarizing plate can be used such that the polarizing layer is stacked on the substrate. In addition, when the surface of the substrate has releasability, a laminate including the alignment layer and the polarizing layer may be removed from the surface of the substrate, and then attached to an adherend to form another polarizing plate.

Figure 5:
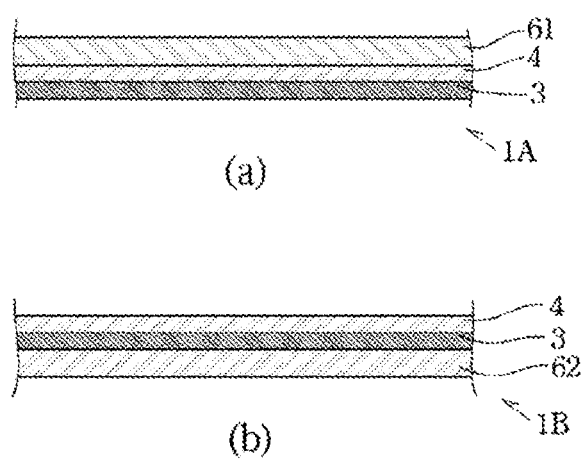
FIG. 5 is a partial sectional view illustrating a polarizing plate according to the other embodiment of the present invention.

For example, FIG. 5(a) illustrates a polarizing plate 1A The polarizing plate 1A is formed in such a manner that the alignment layer 3 and the polarizing layer 4 included in the polarizing plate 1 of FIG. 1 are removed from the substrate 2, and a first adherend 61 is then attached to the upper surface of the polarizing layer 4. Further, when this first adherend 61 has releasability, the alignment layer 3 and the polarizing layer 4 included in the polarizing plate 1A may be removed from the first adherend 61, and a second adherend 62 may then be attached to the lower surface of the alignment layer 3 to form a polarizing plate 1B as illustrated in FIG. 5(b).

Figure 6:
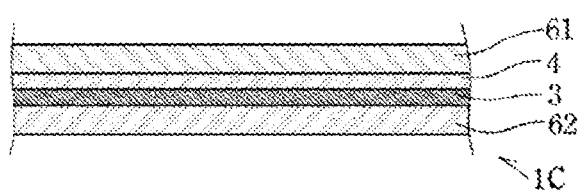
FIG. 6 is a partial sectional view illustrating a polarizing plate according to the other embodiment of the present invention.

FIG. 6 illustrates a polarizing plate 1C. The polarizing plate 1C is formed in such a manner that the alignment layer 3 and the polarizing layer 4 included in the polarizing plate 1 of FIG. 1 are removed from the substrate 2; a first adherend 61 is then attached to the upper surface of the polarizing layer 4; and a second adherend 62 is attached to the lower surface of the alignment layer 3.

EXAMPLES

Hereafter, the present invention will be further described in detail by showing Examples and Comparative Examples. However, the present invention is not particularly limited to the following Examples. Here, the measuring methods used in Examples and Comparative Examples are as follows.

[Method for Measuring Thicknesses of Alignment Layer and Polarizing Layer]

The thickness of the alignment layer and the thickness of the polarizing layer were determined by removing portions of the alignment layer and of the polarizing layer from the substrate, and then measuring level differences between the substrate, and the alignment layer and the polarizing layer using a three-dimensional non-contact surface profile measurement system (manufactured by Ryoka Systems Inc., trade name "Micromap MM5200").

[Method for Measuring Transmittance and Dichroic Ratio]

The transmittance (Ts) and dichroic ratio of the polarizing plate were measured using a spectrophotometer (manufactured by JASCO Corporation, trade name "V-7100").

A transmittance value used herein of a polarizing plate is a Y value with the luminosity corrected using a 2-degree observer according to JIS Z8701 (Illuminant C) based on the flux of completely polarized light, defined as 100%, obtained by passing through a Glan-Taylor prism polarizer. The wavelength used in the measurement was 550 nm.

In addition, linearly polarized measurement light was input into the evaluated polarizing plate from the polarizing layer side thereof to determine the values of k1 and k2, which are the Y values with the luminosity corrected. These k1 and k2 were substituted into the equation given below to calculate the dichroic ratio. As used herein, the value k1 is the transmittance of the linearly polarized light along a direction of maximum transmittance of the polarizing plate, while the value k2 is the transmittance of the linearly polarized light along a direction perpendicular to the direction of the maximum transmittance. The equation used was as follows: Dichroic ratio=log (1/k2)/log (1/k1).

[Synthesis of Organic Dye]

A monoazo compound was obtained by diazotization and the coupling reaction between 4-nitroaniline and 8-amino-2-naphthalene sulfonic acid in the usual manner ("Riron Seizo Senryo Kagaku (Theoretical Production, Dye Chemistry) 5$^{th}$ edition" by Yutaka Hosoda), published on Jul. 15, 1968, GIHODO SHUPPAN Co., Ltd., pages 135 to 152. The obtained monoazo compound was diazotized in the usual manner, and further a crude product was obtained by coupling reaction between 1-amino-8-naphthol-2,4-disulfonic acid lithium salt. The disazo compound represented by the following structural formula (7) was obtained by salting out this composition with a lithium chloride.

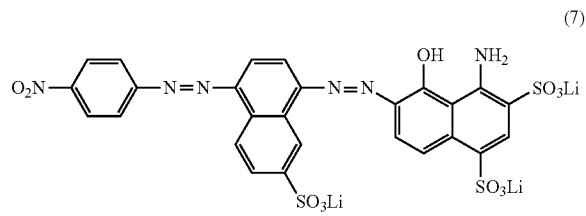

(7)

Example 1

An amorphous norbornene based polymer (manufactured by Zeon Corporation, Japan, trade name "ZNX330R") that is a polymer blend having repeating units respectively represented by structural formulae (I) to (III) shown below was dissolved in cyclohexane to prepare a 10% by mass of first coating liquid.

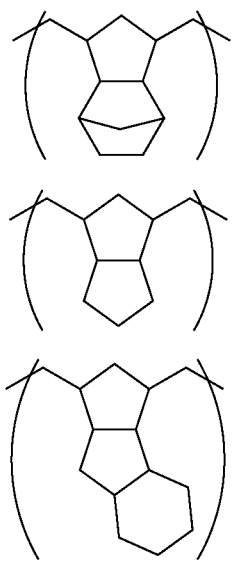

A substrate (manufactured by FUJIFILM Corporation, trade name "TD80UL") of 80 μm in thickness formed of triacetyl cellulose (glass transition temperature (Tg): 163° C.) was prepared, and a first coating liquid was then applies on the substrate using a bar coater (manufactured by BUSCHMAN Co., Ltd., trade name "Mayer rot HS5") to form a first coating film. The first coating film was dried at a temperature of 80° C. for 10 minutes to form a first dry coating film (5 μm in thickness).

A rubbing treatment was carried out on the surface of the first dry coating film using, as the rubbing cloth, a rayon cloth (manufactured by Yoshikawa Chemical Co., Ltd., trade name "YA-181-R") wound around an iron core to form an alignment layer. Thereafter, a corona treatment was carried out on the surface of the alignment layer using a corona treatment apparatus of table type. Thus, a laminate including the substrate and the alignment layer was produced.

Two test polarizing plates (iodine based polarizing plates) were prepared and arranged in crossed nicol with each other, and a comparison was made between a configuration in which only the substrate used in Example 1 is interposed between the polarizing plates, and a configuration in which a laminate of the substrate and the alignment layer produced in Example 1 is interposed between the polarizing plates. This comparison showed a similar degree of light output. It was therefore concluded that the alignment layer was substantially optically isotropic.

A disazo compound represented by the structural formula (7) shown above was dissolved in ion-exchanged water to prepare a 4% by mass second coating liquid.

The second coating liquid was applied on the surface of the laminate of the substrate and the alignment layer (the corona-treated surface of the alignment layer) using a bar coater identical or similar to one described above to form a second coating film. The second coating film was naturally dried in a temperature-controlled chamber at a temperature of 23° C. to form a second dry coating film (polarizing layer: 200 nm in thickness).

Measurement of optical characteristics of the polarizing plate produced as described above showed a transmittance of 42% and a dichroic ratio of 34.

Example 2

A polarizing plate was produced similarly to Example 1 except that a film (manufactured by Mitsubishi Plastics, Inc., trade name "DIAFOIL T100-38") formed of polyethylene terephthalate (glass transition temperature (Tg): 150° C.) of 38 μm in thickness was used as the substrate.

Measurement of optical characteristics of the polarizing plate produced as described above showed a transmittance of 41% and a dichroic ratio of 32.

Example 3

The alignment layer and the polarizing layer were removed from the substrate in the polarizing plate produced in Example 2 to prepare a laminate including only the alignment layer and the polarizing layer. The polarizing layer of the prepared laminate was attached onto the surface of an adherend, which is a glass sheet (manufactured by Matsunami Glass Ind., Ltd., trade name "MICRO SLIDE GLASS"; 50 mm×45 mm, 1.3 mm in thickness) using adhesive to form a polarizing plate including the alignment layer, the polarizing layer, and the glass sheet stacked from bottom to top in this order (see FIG. 5(a)).

Measurement of optical characteristics of the polarizing plate produced as described above showed a transmittance of 40% and a dichroic ratio of 31.

Comparative Example 1

A polarizing plate was produced similarly to Example 1 except that the alignment layer was not formed on the substrate, and that a rubbing treatment and a corona treatment were carried out, and a second coating liquid was then applied, on the surface of the substrate.

Measurement of optical characteristics of the polarizing plate produced as described above showed a transmittance of 41% and a dichroic ratio of 3.

Comparative Example 2

A polarizing plate was produced similarly to Example 2 except that the alignment layer was not formed on the substrate, and that a rubbing treatment and a corona treatment were carried out, and a second coating liquid was then applied, on the surface of the substrate.

Measurement of optical characteristics of the polarizing plate produced as described above showed a transmittance of 41% and a dichroic ratio of 2.

Comparative Example 3

A third coating liquid was prepared which contained polyamic acid that was a precursor of polyimide, and a solvent (N-methyl-2-pyrrolidone).

The third coating liquid was applied on a glass substrate of 1.3 mm in thickness, and was dried at a temperature of 80° C. for 2 minutes. The resultant was then fired at 200° C. for 10 minutes to form a polyimide film. A rubbing treatment and a corona treatment were carried out on the surface of this polyimide film similarly to Example 1 to form a polyimide alignment layer. After this, similarly to Example 1, a second coating liquid was applied on the alignment layer, and was then dried to produce a polarizing plate.

Measurement of optical characteristics of the polarizing plate produced as described above showed a transmittance of 41% and a dichroic ratio of 23.

[Evaluation]

The polarizing plates of Examples 1 and 2 each using an alignment layer containing an amorphous norbornene based polymer, which is a cycloolefin based resin, exhibited dichroic ratios higher than the dichroic ratios of the polarizing plates of Comparative Examples 1 and 2 not containing alignment layers. This shows that providing an alignment layer provides an improvement in light polarization properties of that polarizing plate.

The polarizing plates of Examples 1 and 2 also exhibited a dichroic ratio higher than the dichroic ratio of the polarizing plate of Comparative Example 3 having an alignment layer containing polyimide. This shows that use of an alignment layer containing a cycloolefin based resin results in formation of a polarizing plate that has a higher dichroic ratio than the dichroic ratio achieved with an alignment layer containing polyimide.

The need for firing the polyamide film to form an alignment layer containing polyamide requires the application surface (substrate) for applying the third coating liquid to have heat resistance to at least the firing temperature or more of the polyamide film. Therefore, Comparative Example 3 uses a glass substrate as the application surface.

In contrast, the polarizing plates of Examples 1 and 2 use a cycloolefin based resin as the formation material of the alignment layers, and thus, the need for firing is eliminated. Accordingly, a polarizing plate can be formed on various types of substrates (resin films in Examples 1 and 2) that have no heat resistance to the firing temperatures.

INDUSTRIAL APPLICABILITY

The polarizing plate of the present invention is applicable in image displays such as liquid crystal display devices.

The method for producing a polarizing plate of the present invention is suitably applicable in producing a polarizing plate having a polarizing layer excellent in alignment performance.

1 Polarizing plate, 2 Substrate, 3 Alignment layer, 4 Polarizing layer, 5 Protective layer

What is claimed is:

1. A polarizing plate comprising:
   a substrate;
   an alignment layer disposed on the substrate; and
   a polarizing layer disposed on the alignment layer, and containing an organic dye having lyotropic liquid crystallinity,
   wherein the organic dye in the polarizing layer is in a form of supramolecular aggregates,
   wherein the alignment layer is formed of a coating film containing a cycloolefin based resin and has a thickness of 2 µm to 10 µm, and
   wherein the alignment layer has a surface on which a rubbing treatment has been performed.

2. The polarizing plate according to claim 1, wherein the cycloolefin based resin is amorphous.

3. The polarizing plate according to claim 1, wherein the cycloolefin based resin is a norbornene based resin.

4. The polarizing plate according to claim 1, wherein the alignment layer is substantially optically isotropic.

5. The polarizing plate according to claim 1, wherein the substrate is a resin film containing a resin, and the resin has a glass transition temperature (Tg) of 180° C. or less.

6. The polarizing plate according to claim 1, wherein the substrate has a surface having releasability.

7. A method for producing a polarizing plate, comprising:
   a step of applying a first coating liquid containing a cycloolefin based resin on a substrate to form a first coating film;
   a step of drying the first coating film to form a first dry coating film;
   a step of performing a rubbing treatment on a surface of the first dry coating film to form an alignment layer having a thickness of 2 µm to 10 µm;
   a step of applying a second coating liquid containing an organic dye on a surface of the alignment layer on which the rubbing treatment has been performed to form a second coating film; and
   a step of drying the second coating film to form a second dry coating film as a polarizing layer.

* * * * *